(12) United States Patent
Phillips et al.

(10) Patent No.: US 12,413,654 B2
(45) Date of Patent: Sep. 9, 2025

(54) SYSTEM AND METHOD FOR TRAINING SYSTEMS MANAGEMENT

(71) Applicant: CIBR Ready, LLC, Holly Springs, NC (US)

(72) Inventors: Kevin Phillips, Knightdale, NC (US); Grant Michael Gibson, Lillington, NC (US); Ben Dudek, Winston, GA (US); Andrew Liriano, Durham, NC (US)

( * ) Notice: Subject to any disclaimer, the term of this patent is extended or adjusted under 35 U.S.C. 154(b) by 0 days.

(21) Appl. No.: 18/391,958

(22) Filed: Dec. 21, 2023

(65) Prior Publication Data
US 2025/0211656 A1    Jun. 26, 2025

(51) Int. Cl.
| | |
|---|---|
| G06F 15/16 | (2006.01) |
| G06F 9/455 | (2018.01) |
| H04L 67/02 | (2022.01) |
| H04L 67/56 | (2022.01) |
| H04L 69/16 | (2022.01) |

(52) U.S. Cl.
CPC ........ *H04L 69/162* (2013.01); *G06F 9/45558* (2013.01); *H04L 67/02* (2013.01); *H04L 67/56* (2022.05); *G06F 2009/45595* (2013.01)

(58) Field of Classification Search
CPC ....... H04L 69/162; H04L 67/02; H04L 67/56; G06F 9/45558; G06F 2009/45595
See application file for complete search history.

(56) References Cited

U.S. PATENT DOCUMENTS

| | | | | |
|---|---|---|---|---|
| 2004/0267938 | A1* | 12/2004 | Shoroff | H04L 65/4038 709/227 |
| 2016/0044071 | A1* | 2/2016 | Sandholm | H04L 67/02 709/204 |
| 2024/0320515 | A1* | 9/2024 | Quesada | G06N 5/01 |

* cited by examiner

*Primary Examiner* — Padma Mundur

(57) ABSTRACT

This document presents a system and method for combining combinations of training lessons, containers, a serverless platform and monitoring of student issues and activities to both monitor and assist in training. The system presents an application that specifies a system and method for distributing training lessons through a websocket utilizing a reverse proxy. This application provides a novel ability to track and monitor student and other user activity to provide arbitration on the user's activity by one or more monitors or supervisors of the training activities.

9 Claims, 4 Drawing Sheets

SYSTEM AND METHOD FOR TRAINING SYSTEMS MANAGEMENT

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Training systems are used in multiple industries to provide access to techniques and steps for learning a new system, device, or field of study. Numerous training systems utilize computer input devices to facilitate the access to and use of training scenarios for users who must acquire the training. Typically, the training scenarios and problems are accessed through a proxy server that sits in front of a group of client machines. When the client machines make a request to sites and services on the network, the proxy server intercepts those requests and then communicates with web servers on behalf of those clients.

In a standard networked communication a user device would reach out directly to a server through the proxy server. This proxy server provides a cutout between user devices and a training server to ensure security for the client device or serve as a way to restrict browsing or other networked access from the user devices.

Commonly used in training systems, a proxy server and networked connection provide a straight forward means for the connection to a training server to complete one or more training activities. A forward proxy sits in front of a client devices and ensures that no origin server ever communicates directly with a specific client. However, reverse proxy connection, that protects and provides load balancing capability for a server, may provide for more uniform, faster, and broader access to training activities for large groups of users.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
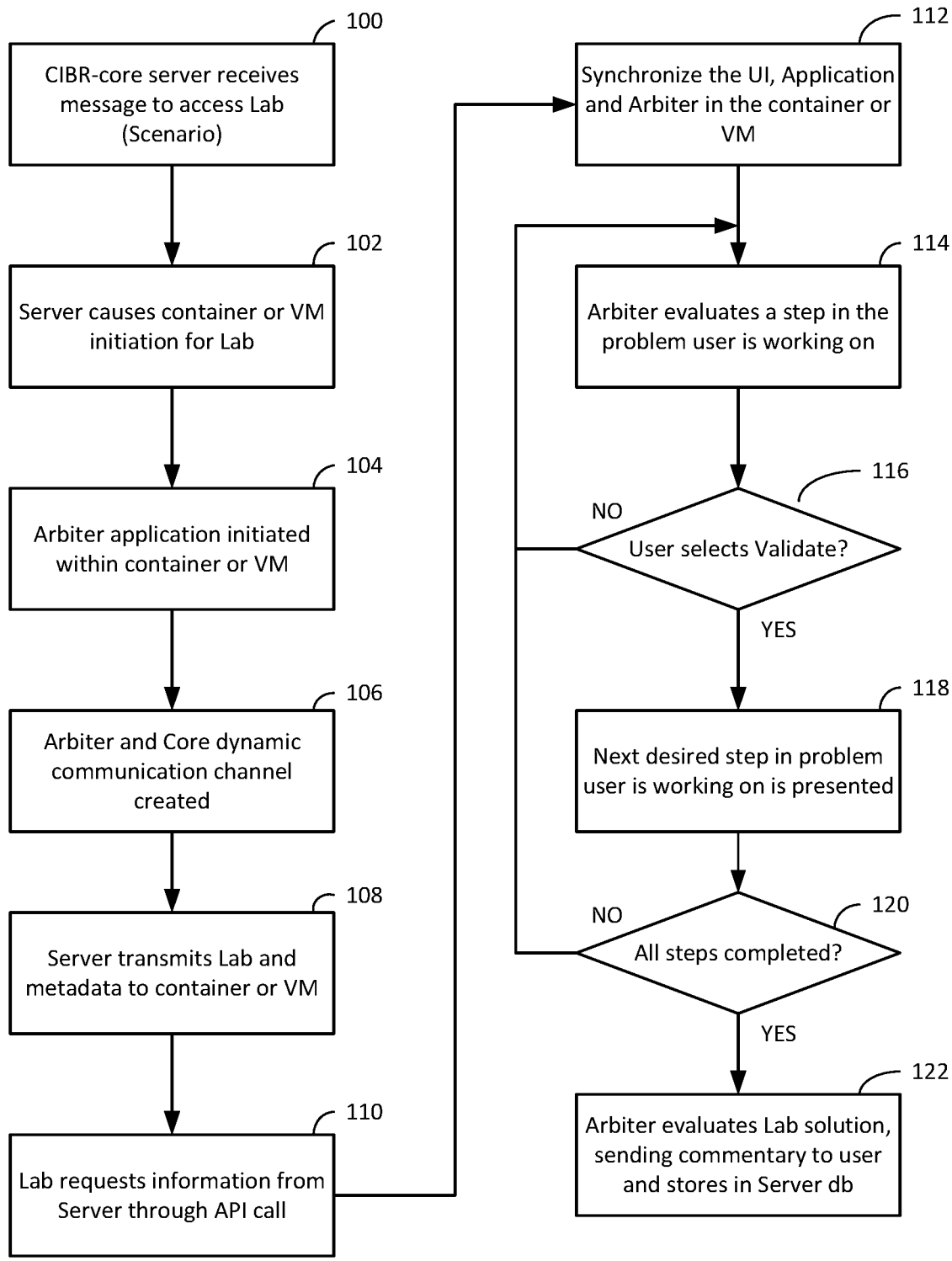
FIG. 1 is a flow diagram of the construction and evaluation of lab scenarios consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although no necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Scenario and Lab are equivalent terms when used herein.

As used herein, the term "noVNC" refers to the no Virtual Network Computing (noVNC) HTML VNC client JavaScript library and application built on top of that library to permit any modern browser to operate an application through a network connection.

In an embodiment, a networked data processor comprising a central server entitled CIBR-core contains and manages an electronic data storage that is the main database for the CIBR-core system central server that communicates with client or user networked computers utilizing a mono or bidirectional websocket communication channel both directly and in some cases through a reverse proxy. In this embodiment, all Arbiters initiated and maintained within containers or Virtual Machines in datacenters or on client or user computers report their own internal context to the CIBR-core central server, potentially both at the operating system level and also in relation to the Scenario (Lab) that is assigned to each Arbiter.

In an embodiment, the CIBR-core central server may receive a user request transmitted from a front-end application message operational on a browser or other User Interface application to request from the CIBR-core central server access to a lab or scenario, to provide a scenario for the user to complete. The user's request is transmitted through the internet or other network connection utilizing a websocket connection. The user's request is received at a reverse proxy server that isolates the CIBR-core central server from direct communication with any number of client computers that originate the user request through the front-end application and to the network. Upon receipt of the user request for access to a lab or scenario, the CIBR-core central server transmits a message through the reverse proxy server to create a container for the lab permitting the user to interact with the lab and work with the scenario as a live operating system image having a user interface display on the user computer and receiving all lab or scenario data, information, and directions from the CIBR-core server. As a part of said container's boot process, the Arbiter application inside the container is initiated and in operation, where it starts an HTTP server exclusive to that container/lab. Communication between this Arbiter application and the user front-end (and therefore, by extension, CIBR-core server backend) begin almost immediately either by establishing a bidirectional communication capability utilizing a websocket protocol connection, or by the front end interacting with Arbiter via HTTP as a direct consequence of user actions within the lab. The communication between the front-end and the Arbiter is performed by transferring requests and data through the reverse proxy to the CIBR-core server through the established HTTP and/or websocket communication pathway. While the container was given metadata about the lab, such as the scenario identifier and the user name and email address of the user that requested the lab, the container was not given the entire body of information that permits the lab to be presented to the user and permits the user to work with and complete the Lab scenario. The container immediately requests all scenario information, including data values, additional metadata (if any), displayable information, and any information required to determine if the user is performing the actions required by the scenario from CIBR-core via API calls through the websocket pathway at initiation of the scenario. Upon receipt of all information from CIBR-core central server, the container is ready to begin user interaction for the scenario. The container will also communicate with CIBR-core throughout the lab once again utilizing the established websocket communication pathway. The container communicates with the user through the front-end user interface and through direct interaction with the mouse and keyboard through the viewport of the operating system image displayed to the user on the display device accessed by the user.

In an embodiment, the common front-end controls accessible to the user include resizing the viewport of the container, as well as lab navigation and both user and data validation. The common front-end controls are configured and updated in the operating system active in the CIBR-core system and involve actions by the Arbiter and operating system itself. Lab Navigation involves synchronization of the application's front end User Interface (UI) as well as within the Arbiter itself. When the user clicks "Previous" or "Next" problem to navigate through the application provided in the scenario, both the front-end UI and the Arbiter inside the container need to be updated to ensure all parts of the application are in sync. To accomplish this synchronization, the UI may send a request to the CIBR-core central server which will then route that request to the Arbiter with which the user is interacting, once again utilizing the websocket communication pathway. At this point the Arbiter may perform the update adjustment and send a response back to the central server, which will relay that to the calling front end. The Arbiter may update its condition and send a response that updates have been completed. At this point the front-end UI will be updated and synchronization is complete for that time span.

In the embodiment, Lab Validation is one of the primary reasons Lab Navigation is necessary. To assess whether the student is completing the lab, or scenario, correctly, the Arbiter has to be able to evaluate the problem in the scenario that the user is in the midst of solving, and know the criteria for successfully completing each step in working through the scenario and the problems within the scenario. Any time the user clicks the "validate" button on the front-end UI a message is sent through the reverse proxy server to the CIBR-core data processor and then relayed to the Arbiter. Upon receiving the message, the Arbiter has (as a part of the body of the lab it received upon request from CIBR-core) a short description of what would constitute the solution of the Problem in the lab, which was received as a part of the body of the lab received when the lab was initiated by the request from the CIBR-core processor. The Arbiter also will receive instruction and information as to how to evaluate this programmatically and logically. The received instruction and information provide the Arbiter with the manner and instructions to determine if the steps have been carried out to successfully complete the problem and/or scenario. This is typically done as a combination of a scripting language native to the container, such as, in non-limiting examples, Bash or Powershell, along with some basic logic for problem objects and solution objects encapsulated within the Arbiter. The problem objects and solution objects can be configured when constructing the lab objects as a whole. Whether the problem the user completes is evaluated as solved correctly or not, this information will be propagated back to the front end through the reverse proxy and to the CIBR-core processor, which will make a record of each problem attempt by each user. This central database account of the lab progress is the ultimate measure of synchronization. All communication between the front-end user interface and the Arbiter itself passes through the CIBR-core data processor to permit a central repository of truth to be efficiently enabled, tracked, and maintained by the CIBR-core data processor.

In an embodiment, the CIBR-core data processor may implement the Arbiter in one of two versions based upon the computer components upon which the CIBR-core system is installed. In a first implementation the Arbiter may be implemented in .NET Core which runs on Windows, Linux, and Android capable devices. In a second implementation, the Arbiter may be implemented in a system that is Javascript enabled for the Arbiter to run in a browser and Node runtime. In some instances, the CIBR-core central server is isolated from direct communication with the Arbiter instantiated by any user hosted on a remote datacenter by passing communications through a websocket communication connection established between a third-party .NET application running in said datacenter and the CIBR-core application itself. This connection method provides a layer of abstraction between the CIBR-core central server and any number of client machines, permitting greater flexibility in the number and type of connections between user or client machines and the CIBR-core central server. Between these implementations, not only will the Arbiter theoretically run on virtually any machine configuration, the Arbiter can also run in the browser tab of any device that can run a modern browser with no degradation in communication or operational capability.

In an implementation, containerized versions of Arbiter, as well as versions of Arbiter running inside of Windows Virtual Machines (VMs), are essentially .NET Core Applications. Each version of the Arbiter is inherently a console application. However, each Arbiter implementation will initiate an HTTP server based on the context of the container in which the Arbiter is installed, whether or not the container is command line or a GUI container instance. This installation confers the status of a console application that may additionally function as a web server.

In an additional embodiment, the CIBR system may have a secondary implementation of Arbiter coded in Javascript, and designed to be able to run in both NodeJS and also any browser. Some versions of Arbiter are run in the browser, such as in a non-limiting example, the Operating System image, as well as the Arbiter itself, all contained in the browser. The versions of the Arbiter that run in the browser are referred to as "CIBR-Envoy". Additionally, there is an implementation of Arbiter meant to use the operating system upon which the User implementation of the browser is active as the host machine. This implementation of the Arbiter operates using an ElectronJS application with a NodeJS back end to run validation against the host machine using the same Javascript implementation of Arbiter. NodeJS, just as .NET Core is able, is also able to generally run on Linux, Windows and so on regardless of operating system.

In this way, users can run the Arbiter application in their own browser on a Linux machine, navigating and completing Windows labs in their browser by running Arbiter itself on a Windows OS, while running their browser on a Linux host machine. In an alternative implementation, a user may run an operating system virtually inside their browser tab using webassembly, with Arbiter in the browser tab, or they can run Arbiter inside the host environment of the operational computer equipment, such as Windows.

In an embodiment, the basic process of creating and managing one or more containers can be driven via an Application Programming Interface (API) whether it's Docker API or Azure API. This process can include creating the instance of the VM or Container, creating a websocket connection between the container and the reverse proxy server, managing the VM or container instance, tearing down the websocket connection, and destroying the VM or container instance as well. In all cases Arbiter would be embedded within the container. The difference between Docker API calls and Azure API calls is nearly arbitrary.

Azure is distinct because it utilizes VMs instead of containers. Because it exists to facilitate Windows GUI images, it cannot benefit from Docker, for which no Windows GUI image exists; instead, the Azure API is utilized. As a point of reference, containers are processes and VMs are not, VMs typically have more virtualized hardware than containers do. Aside from the key differences between VMs vs containers, as well as the differences between Azure API and Docker API, the core functionality is surprisingly close to identical. There are mechanisms, such as, in a non-limiting example, API calls, to create containers or VMs. These mechanisms may provide each created container with environment variables, such as user info and lab info, specify a target image, as well as start or destroy said containers or VMs. In all cases the GUI, VMs, and containers may use noVNC, if not Remote Desktop Protocol, to enable GUI connection to the browser. The mechanism employed may contain the standard Arbiter HTTP server, creating and also interacting with both containers and VMs are virtually identical processes, so that the same HTTP calls can be employed and the same noVNC connection protocol can be employed. In this embodiment, from a programmatic perspective, the only major difference in operation is the nature of the API calls, not so much the data being sent, though even these are very close to analogous.

In an embodiment, the CIBR-core system begins the process of providing a lab or scenario to a user when the system receives a request by a user to start a lab. The lab is commissioned, either through a VM implementation or through the creation of a container, as a customized implementation of the lab or scenario that is particular to the user that transmitted the request. To begin the process, the user may navigate in a browser to either Canvas LMS (LTI access) or the Range UI to the course and scenario they wish to begin processing, at which point, once the lab or scenario creation is complete, it is immediately presented to them in their browser, Upon starting the lab via the UI, the users id and the scenario selected are noted, and forwarded from the front-end UI, to the back end of the CIBR-core central server to the appropriate API to start the container or create the VM that corresponds to the lab. This is going to be one of two avenues: Docker (create and start a docker container using Docker API or a docker command) or Azure (Azure API). In either API, the API in question will contain a description of the customization for Arbiter and/or the container, specifically—the lab in question, the user who requested it, any metadata about the operating system, and so on. In fact, the operating system itself is highly customizable when it comes to Docker API, as different images can be requested at the API level. Each of these are custom tailored to the specific details configured for each lab, stored in the database in the CIBR-core central server, and created and customized via a tool contained within the CIBR-core codebase. The tool is termed the "Yet another markup language (YAML)-DB editor" and is an editor of lab and range objects using the MVC paradigm.

Using the container with Arbiter is virtually seamless or even invisible to the user. The user is aware they are interfacing with an operating system image in their browser tab, however, they are not aware explicitly that the "Arbiter" is involved. However, the user may know that the CIBR-core software, in general, is able to tell if the user is completing the assignment as prescribed. The software can verify if the user is performing the steps from the lab, in the operating system image, or not. From the user standpoint, the lab steps are presented by the operating system and the user completes the steps detailed in the lab, and the rest is a black box.

In an embodiment, user progress is logged in the database by the CIBR-core central server. In addition to general activity by users being logged in the database, such as user attempts to solve lab problems, there are ways for instructors to monitor students via VNC. The CIBR-core central server has an admin page which enables instructors to directly observe students in their respective GUI labs. The CIBR-core central server monitors the same graphical user interface for the operating system that the students do.

Upon user submission of their activities for validation, whether the Problem the user was on is evaluated as solved correctly or not, this information will be propagated back to the front end through the monitoring by the CIBR-core central server which creates a record of each user's attempt. This central database account of the lab progress is the ultimate measure of synchronization. All communication between the front-end user interface and the Arbiter itself pass through CIBR-core central server which creates a central repository of truth efficiently enabled in this way.

Importantly, some activities inside the container or VM that are not initially associated with Arbiter may nonetheless be intercepted by Arbiter in one manner or another. In a non-limiting example, in Ubuntu labs, all activity in the terminal is intercepted by Arbiter via the .bashrc config subprocess and subsequently forwarded to CIBR-core, with or without the user initializing navigation, or validation. In this non-limiting example, these formal processes can be initialized informally by normal operating system use.

In an embodiment, the CIBR-core system server will provide status to the user to provide status on whether the user has completed the lab or not. The lab user display may provide a visual representation of the user on the progress page. The user may see the lab function as expected. A graphical user interface and/or command line interface may be provided to each user in their browser tab, apparently synchronized with the representation of the user's progress, as well as instructions for what to do to carry out the current step of the lab. Moreover, users will be able to review their grades, progress, question results, and other information especially on a personalized profile page.

In an embodiment, a Red Vs Blue comparison test can involve many machines, flexible configurations for said machines, and even machines that are not directly assigned to any one user but rather protection for an entire group scenario. This comparison test can involve Kali, windows, any number of operating systems.

In the case of single user, but multi-system labs, two or more containers or VMs will be displayed, but only one at a time. The user display may display clickable tabs to each user to provide the ability for each user to switch between all displayed tabs. The clickable tabs will be created at the time of starting the lab, and each will have very similar environment variables upon startup as configured in the lab range objects. The tabs may be configured for different operating system images, once again based upon the scenario being performed and/or the equipment upon which the system image is identified as operational for this tab. In a non-limiting example, displayed clickable tabs may include one Ubuntu, one Windows, or alternatively, one Kali, one Android, or tables for any other operating system that may be available to the user. In these cases, the same front end user interface will simply adapt all interactions, such as validation and navigation, to apply to both or all containers instead of just one while still passing all communication through the CIBR-core system server. When any of the Arbiters in question validate a command successfully, all Arbiters will be updated as a consequence, as all Arbiters are involved in the lab and need to remain synchronized with the scenario in action. The synchronization is important because the solution for each Problem in the Lab Scenario could involve any one or multiple of the containers or VMs.

Turning now to FIG. 1, this figure presents a view of the construction and evaluation of lab scenarios consistent with certain embodiments of the present invention. In an exemplary embodiment, at 100 the data server, entitled CIBR-core server, receives a message from an instructor, evaluator, or other administrative personnel to access a lab, or scenario which a participant wishes to access and complete. At 102, the CIBR-core server causes a container or Virtual Machine (VM) to be initiated for the lab, or scenario. As a reminder, there are mechanisms, such as, in a non-limiting example, API calls, to create containers or VMs. These mechanisms may provide each created container with environment variables, such as user info and lab info, specify a target image, as well as start or destroy said containers or VMs.

At 104, the CIBR-core server initiates the Arbiter application with the created container or VM with the lab or scenario identified for this session. At 106, the Arbiter in the container or VM and The CIBR-core process on the server instantiates a dynamic communication channel utilizing some combination of HTTP and websocket communication connection to facilitate the transfer of data and communications between the Arbiter and the core process. At 108, the CIBR-core serve transmits lab or scenario metadata to the container or VM that was initiated for this session either as a part of the container or VM creation, or via HTTP. The metadata pertaining to the lab or scenario is transmitted first to permit the establishment of the environment for the lab or scenario. At 110, the lab or scenario utilizes the dynamic communication channel to request information from the CIBR-core server through an API call to the server. At 112, the user interface (UI), Arbiter, and lab or scenario are synchronized within the container or VM to ensure that all elements are working from the same set of information, that the communication is operational, and that the updates to lab data as the user is performing the lab or scenario remain consistent across the Arbiter, UI, and lab application by updating all processes as changes occur and providing access to all activity data for each step of the lab or scenario problem as the user performs steps to complete the lab or scenario.

At 114, as the user works through the lab or scenario steps, the Arbiter process evaluates the problem the user is working on to determine if steps are performed in order, to determine if steps are completed, and to determine if the steps performed are performed correctly. The Arbiter may be enabled to provide recommendations, information or corrections to the user as they progress through the steps of the problem presented within the lab or scenario if this capability has been enabled by the CIBR-core server. The user may also select process steps to work on out of order. In a non-limiting example, the user may have already completed some steps but may need to finish a set of steps that remain from another session. In this instance, the user may select the step at which to begin work on the lab or session once again. Alternatively, the user may instruct the Arbiter to return to a previous step or skip ahead to another step and bypass a current step. In each instance, the user will be presented with the desired step to be worked on, whether that step occurs in the natural progression of the lab steps, or the user has selected a different desired step for any reason. At 116, the Arbiter may check to see if the user has completed the currently selected desired lab or scenario process step. If the user has not finished, the Arbiter continues in evaluation mode. If the user has completed the selected desired lab or scenario step, the user may select the Validate tab or other enabled position within the UI to communicate to the Arbiter that they have performed the required activities for the selected desired given step in the lab or scenario and are ready to move to the next step in progression, or may select a different desired step to complete. At 118, the user is presented with the next desired step after the Arbiter has validated the completion of the current step, or is instructed to move to a different desired and selected step by the user. At 120, the Arbiter is once again called to determine if all steps in the lab have been completed, or if the user wishes to stop their participation in the current lab and chooses not to complete their participation. At 122, the Arbiter evaluates the problem solution for completeness and correctness, and/or level of participation, and may send commentary to the user as to the status of the lab or scenario problem solution while storing the lab or scenario status, user identify, and other data relevant to the lab or scenario activity for the particular user and lab or scenario.

Figure 2:
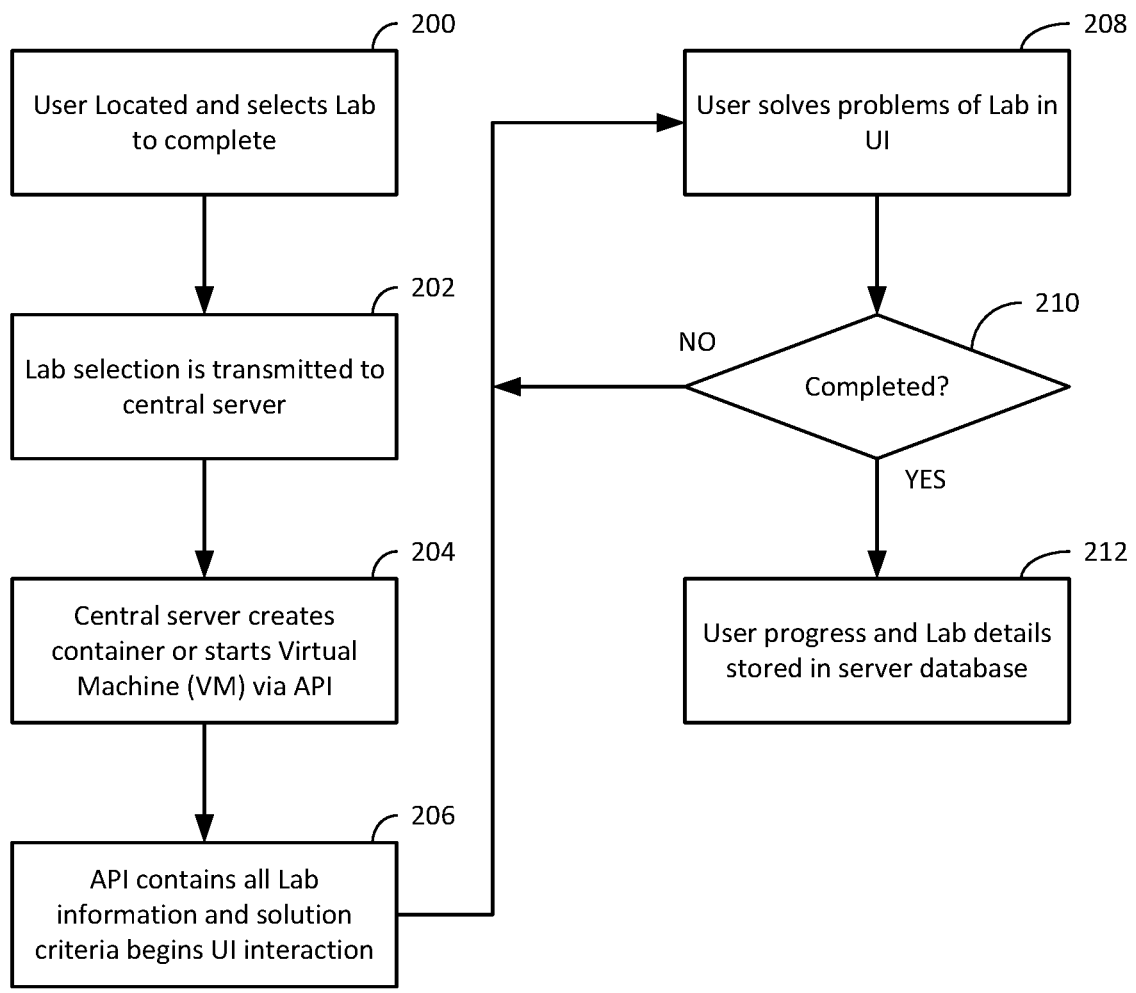
FIG. 2 is a flow diagram of user selection and initiation of a lab consistent with certain embodiments of the present invention.

Turning now to FIG. 2, this figure presents a view of user selection and initiation of a lab consistent with certain embodiments of the present invention. In an exemplary embodiment, at 200 a user may access the CIBR-core server through a UI to locate and select a lab or scenario containing a problem that they wish to complete. At 202, the user's lab or scenario selection is transmitted to the CIBR-core server for access to the lab or scenario. At 204, the CIBR-core server retrieves the lab or scenario from electronic storage and creates a container or VM through an API call to the system containing the UI that is being operated by the user. At 206, the transmission of the lab or scenario through the API call contains all of the metadata for the lab or scenario environment as well as all information for the problem to be solved and all solution criteria for the problem. After this data has been transmitted to the container or API the user may begin to interact with the lab or scenario by performing the steps for the problem solution. At 208, the user works through the steps of the problem presented in sequence by the lab or scenario through the UI. At 210, the system checks to determine if the user has completed all steps of the lab or scenario to finish the problem solution. If the user is not yet finished, the process returns to step 208. If the user has completed all of the steps necessary to finish the problem solution for the lab or scenario, the process at 212 transmits all of the user activity data and lab or scenario details to the CIBR-core server, which then stores all activity data, lab or scenario details, and user identification information to a database in an electronic storage element.

Figure 3:
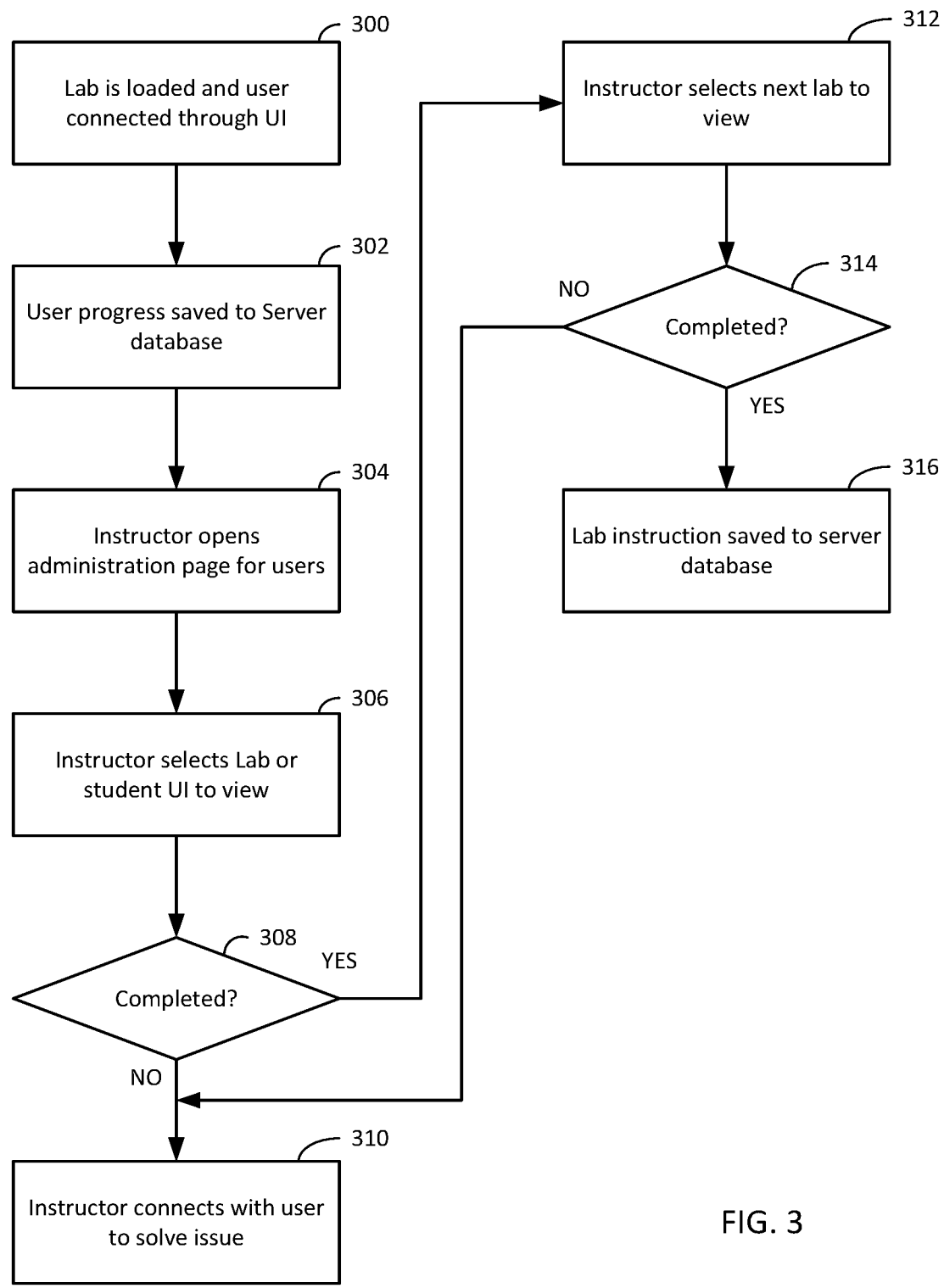
FIG. 3 is a flow diagram of Instructor interaction consistent with certain embodiments of the present invention.

Turning now to FIG. 3, this figure presents a view of Instructor interaction consistent with certain embodiments of the present invention. In an exemplary embodiment, at 300 a lab or scenario is requested and loaded, with the user provided access to the loaded lab or scenario through UI. At 302, the user begins processing the steps provided in the lab or scenario to solve the problem posed in the loaded lab or scenario. At 304, an instructor may open the administration page that provides the information on all users involved with any lab or scenario that has been loaded and is currently active. This administration page provides a view of all users that are currently active with any lab or scenario and contains multiple entries and frequently lists these entries on multiple pages. At 306, the instructor may access the administration page and move the cursor through the pages and listing of entries until the student UI in which the instructor has an interest is located and the view of that user's activity and progress is displayed when the selection is complete at 308.

If a user has not yet completed the lab or scenario, the instructor may communicate with the user at 310 to provide answers to questions or to solve or offer solutions for issues or problems that the user encounters during their progression through the lab or scenario. At 312, if the user has no issues, questions, or problems to be solved by instructor interaction, the instructor may navigate once more through the pages and entries in the administration page to select the next lab or scenario to view. At 314, if the newly selected user lab or scenario is, once again, not complete the process may return to step 310 to provide the assistance of the instructor.

If, however, the lab or scenario selected is complete and there are no other users actively progressing through a loaded lab or scenario, at 316 the instructor may save all communication, lab activity, lab data, and metadata to a database maintained in an electronic storage element that is part of the CIBR-core server.

Figure 4:
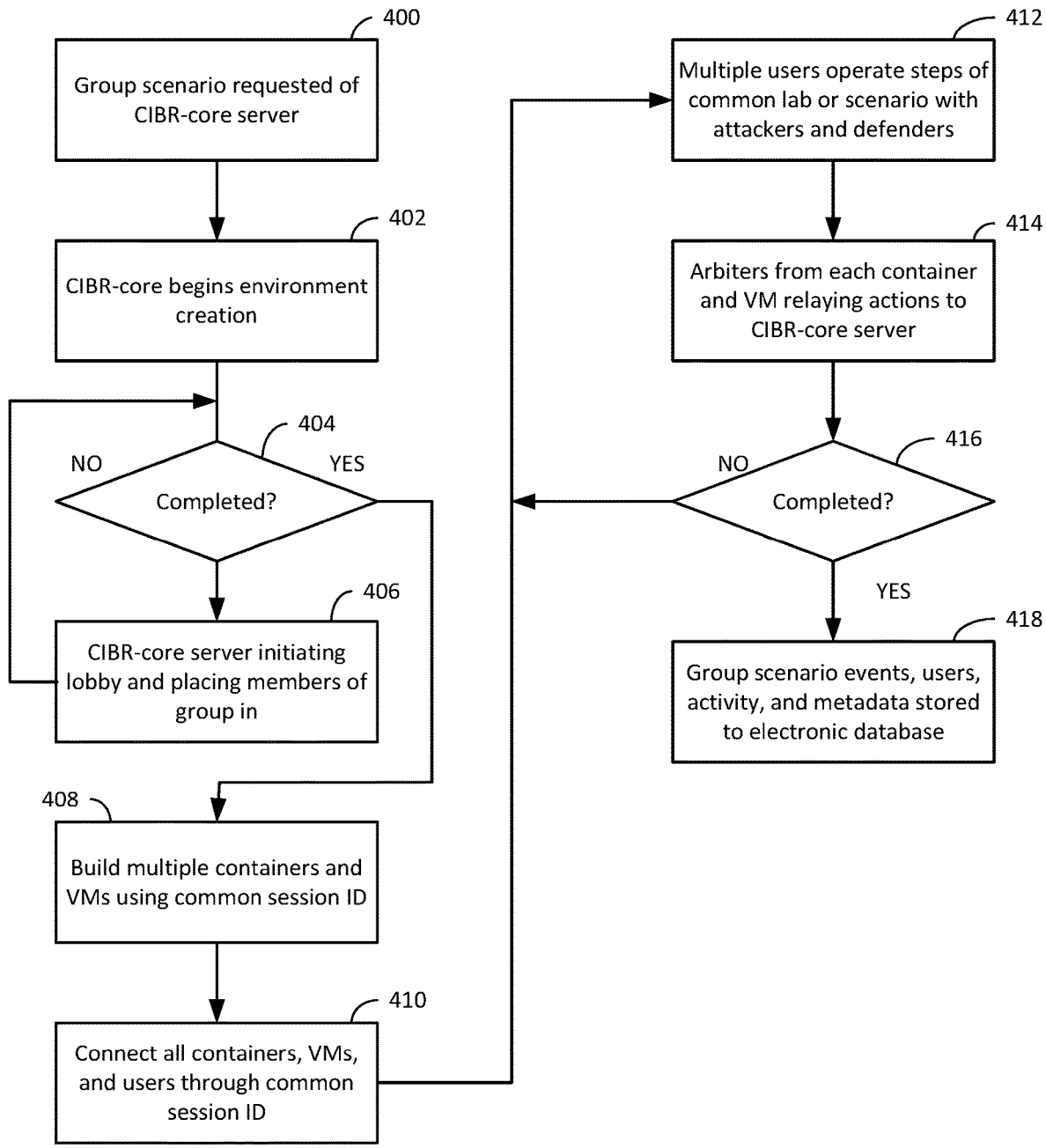
FIG. 4 is a flow diagram of Group scenario or lab interaction consistent with certain embodiments of the present invention.

Turning now to FIG. 4, this figure presents a view of Group scenario or lab interaction consistent with certain embodiments of the present invention. In an exemplary embodiment, in addition to the most standard of labs, specialized group, or multi-system labs are available from the CIBR-core system server. At 400 the CIBR-core server may be requested to initiate and provide a group scenario for a number of users. The Group Labs may commonly involve "attacking" and "defending" a VM or container that was instantiated not to belong to any one particular user, but the entire group or multi-user scenario. At 402 an environment is built for these scenarios and labs that can involve any number and any combination of users, VMs, containers, and more in accordance with the configuration parameters set prior to lab initiation. At 404, the CIBR-core server determines whether the environment is completed or not. If still incomplete, at 406 unlike for normal, single user scenarios, group scenarios may involve a lobby and a wait time until the scenario starts, at which point all configured containers and VMs would be configured per user, created and then connected between the CIBR-core system server and each user machine established and in operation.

At 408, the CIBR-core system server would do the bulk of the heavy lifting at this point, in terms of synchronization, by initiating the lobby, placing each of the members of the group into a lobby until the environment creation is complete, then permitting each member of the group in the lobby to be connected to a single instance of the scenario. At 410, the scenarios are each enabled within a VM, container, or web browser application based upon the type of equipment available to the member of the group that is to be connected to the group scenario. Since the lab is global, encompassing many users and many, many VMs and/or containers, the session id of the group scenario would be used in communications from any Arbiter or any user front end to each user machine. At 412, the session id may be enough for CIBR-core system server to retrieve all associated containers/labs/users or other implementations as the session id would be committed to the database upon runtime of the session/scenario. At 414, any events, such as a goal being reached by the attacking team, or an attack being neutralized by the defending team, or a firewall update being committed, etc., could be synchronized and even broadcast to all frontends or user facing displays via a signalR message utilizing websockets. At 416, if the group scenario or lab is incomplete, the process returns to 412 to continue the operation of the scenario or lab. At 418, a group scenario could have a clear "timeline" in terms of what events happen when, by who, and once the group scenario or lab is completed the group scenario or lab events, users, activity, and metadata could be recorded in an electronic database and reviewed after the labs have been completed.

While certain illustrative embodiments have been described, it is evident that many alternatives, modifications, permutations and variations will become apparent to those skilled in the art in light of the foregoing description.

What is claimed is:

1. A system to deliver personalized training, comprising:
   a data processor initiates a plurality of data communication channels with a plurality of user devices utilizing websocket connections;
   said data processor receiving one or more messages from users requesting access to one or more training scenarios;
   said data processor transmitting a message through the reverse proxy server to create a plurality of containers and/or virtual machines (VM) s within said user devices permitting any of said users to interact with a training lab and work with a training scenario as a live operating system image;
   said data processor utilizing said websocket connections to initiate an Arbiter application within each of said containers or virtual machines;
   said data processer transmitting said training scenario information and metadata to each of said user devices;
   said data processor synchronizing a user interface, scenario, and said Arbiter application to display and process the same scenario step concurrently;
      said Arbiter application communicating with a user device through the websocket pathway to perform updates and adjustments to training scenarios within said container or VM for any or all of said users;

said Arbiter receiving completed scenario steps as performed by any or all of said users and transmitting commentary on each or any of said scenario steps to the users;

said Arbiter transmitting the scenario steps completed by each of said users to said data processor for storage within and electronic storage device associated with said data processor.

2. The system of claim 1, further comprising the Arbiter active to receive a completed scenario step from a user when said user transmits a request for a completion review.

3. The system of claim 2, wherein the Arbiter evaluates a completed scenario step received from a user for valid completion and saves completion status to a scenario database.

4. The system of claim 1, wherein each of said training scenarios comprises multiple steps directed to the subject of the training to be acquired by a user.

5. The system of claim 1, wherein said reverse proxy connection directs user requests to the data processor through a direct communication connection.

6. The system of claim 1, wherein an instructor is connected from a lab instructor device to said data processor.

7. The system of claim 6, wherein said instructor connection is extended from said lab instructor device to any user device selected from said plurality of user devices through the data processor through said websocket connections.

8. The system of claim 1, further comprising establishing a connection to multiple users simultaneously in a group connection to said plurality of user devices.

9. The system of claim 8, further comprising holding one or more users in a lobby prior to connecting said one or more users into said group connection.

\* \* \* \* \*